Patented June 17, 1941

2,245,572

UNITED STATES PATENT OFFICE 2,245,572

PROCESS OF PREPARING ARSANILIC ACID

Walter G. Christiansen, Glen Ridge, N. J., assignor to E. R. Squibb & Sons, New York, N. Y., a corporation of New York No Drawing. Application June 7, 1938, Serial No. 212,291

3 Claims. (Cl. 260—442)

This invention relates to improvements in the manufacture of p-amino-phenyl-arsonic acid, commonly known as arsanilic acid, an intermediate used in the preparation of tryparsamide and arsphenamine.

Many processes for the preparation of arsanilic acid from aniline and arsenic acid have been described in the literature, but they are, in general, unnecessarily complex, inefficient, and inconvenient, and their indicated high yields cannot be duplicated; for example, the process of United States Patent 1,405,228 involves mechanical difficulties in mixing the reactants.

It is the object of this invention to provide an improved process of preparing arsanilic acid, which is simple and efficient, and regularly gives a good yield.

The improved process of this invention essentially comprises adding arsenic acid to an excess of aniline which has been heated to about 75–100° C., and then heating to reaction temperature, preferably to about 155–160° C.; preferably, the process comprises heating the aniline to about 82° C., adding the arsenic acid thereto slowly, with agitation, rapidly heating to about 155–160° C. and maintaining that temperature for several, say four to five, hours. Preferably, the molar ratio of aniline to arsenic acid in this process is about 3:1 (whereas the theoretical ratio for the formation of arsanilic acid is 1:1). Owing to the proportion of aniline and the initial heating thereof, the aniline arsenate formed does not materially thicken the reaction mixture; and the reactant-mixing difficulties experienced in prior processes are avoided.

The following example is illustrative of the invention: 800 cc. of aniline is placed in a 2-liter vessel equipped with an agitator, dropping funnel, and thermometer; the aniline is heated to 82° C., and while agitating, 518 grams of 82% arsenic acid is added through the dropping funnel during a period of fifteen minutes (the slight thickening, due to formation of aniline arsenate, does not interfere with agitation); the temperature is then rapidly raised to 155–160° C. and maintained thereat for about 4.5 hours; the reaction mixture, after slight cooling, is immediately poured (with continuous stirring) into 1 liter of water containing 165 grams of sodium hydroxide, and after standing overnight the lower layer formed (an aqueous solution containing some crystals of sodium arsanilate) is separated from the upper layer of unreacted aniline, diluted with a little water to dissolve the crystals of sodium arsanilate, decolorized with Nuchar (an adsorbent carbon), and filtered; hydrochloric acid is then added (until the solution is just faintly acid to litmus paper but not to Congo red) to precipitate arsanilic acid, the solution is chilled to complete the precipitation, and the precipitate is collected on a suction funnel, washed with water, and dried at 100° C. The arsanilic acid thus obtained is about 95% pure and the yield is about 21.5% of the theoretical. Further purification can be effected by recrystallization from boiling water, as described in the literature.

The invention may be variously otherwise embodied within the scope of the appended claims.

I claim:

1. The process of preparing arsanilic acid which comprises slowly adding arsenic acid to an excess of aniline which has been heated to about 82° C., while agitating, then rapidly heating to a temperature of about 155 to about 160° C., and maintaining that temperature for about four to five hours.

2. The process of preparing arsanilic acid which comprises slowly adding a mol of arsenic acid to about three mols of aniline which has been heated to a temperature of about 75 to about 110° C., while agitating, then rapidly heating to a temperature of about 155 to about 160° C., and maintaining that temperature for about four to five hours.

3. The process of preparing arsanilic which comprises slowly adding arsenic acid to an excess of aniline which has been heated to a temperature of about 75° C. to about 110° C., while agitating, then rapidly heating to a temperature of about 155° C. to about 160° C., and maintaining that temperature for several hours.

WALTER G. CHRISTIANSEN.